US009840567B2

(12) United States Patent
Fouarge et al.

(10) Patent No.: US 9,840,567 B2
(45) Date of Patent: Dec. 12, 2017

(54) OLEFIN POLYMERIZATION PROCESS WITH CONTINUOUS TRANSFER

(71) Applicant: TOTAL RESEARCH & TECHNOLOGY FELUY, Seneffe (BE)

(72) Inventors: Louis Fouarge, Dilbeek (BE); Annelies Horre, Temse (BE); Geert Nauwelaerts, Zoersel (BE); Marc Richet, Oignies en Thierache (BE); Pascal Wilderiane, Biercee (BE)

(73) Assignee: Total Research & Technology Feluy, Seneffe (BE)

( * ) Notice: Subject to any disclaimer, the term of this patent is extended or adjusted under 35 U.S.C. 154(b) by 149 days.

(21) Appl. No.: 14/762,529

(22) PCT Filed: Jan. 21, 2014

(86) PCT No.: PCT/EP2014/051144
§ 371 (c)(1),
(2) Date: Jul. 22, 2015

(87) PCT Pub. No.: WO2014/114646
PCT Pub. Date: Jul. 31, 2014

(65) Prior Publication Data
US 2015/0361186 A1 Dec. 17, 2015

(30) Foreign Application Priority Data

Jan. 22, 2013 (EP) ..................................... 13152269

(51) Int. Cl.
*C08F 2/01* (2006.01)
*C08F 2/14* (2006.01)
(Continued)

(52) U.S. Cl.
CPC . *C08F 2/01* (2013.01); *C08F 2/14* (2013.01)

(58) Field of Classification Search
CPC . C08F 2/01; C08F 2/14; B01J 19/1868; B01J 19/1818
(Continued)

(56) References Cited

U.S. PATENT DOCUMENTS 6,864,207 B2  3/2005  Knoeppel et al.
6,930,071 B2  8/2005  Knoeppel et al.
(Continued)

FOREIGN PATENT DOCUMENTS

EA  200601490 A1  2/2007
EP  0277004 A1  8/1988
(Continued)

OTHER PUBLICATIONS

International Search Report issued in PCT/EP2014/051144, dated Apr. 7, 2014, 4 pages.
International Preliminary Report on Patentability issued in PCT/EP2014/051144, dated Apr. 23, 2015, 5 pages.
Office Action issued in Eurasian Application No. 201591029, dated Oct. 27, 2016, 4 pages.

*Primary Examiner* — Fred M Teskin
(74) *Attorney, Agent, or Firm* — Albert Shung

(57) ABSTRACT

A process for the preparation of a polyolefin is disclosed. The process includes introducing one or more olefin reactants, diluents and polymerization catalyst into a first loop reactor, and while circulating the olefin reactants, diluents and polymerization catalyst in the first loop reactor. The method includes polymerizing the one or more olefin reactants to produce a polyolefin slurry comprising liquid diluent and solid olefin polymer particles. The method includes withdrawing polyolefin slurry comprising solid olefin polymer particles and diluent from the first reactor and introducing the withdrawn particles into a second loop reactor, by means of one or more settling legs provided on the first reactor, wherein each settling leg has an inlet connected to the first reactor and an outlet connected to the second reactor by means of a transfer line wherein at least one settling leg (Continued)

is continuously open allowing continuous transfer of solid olefin polymer particles from the first loop reactor to the second loop reactor. The process further comprises controlling the continuous transfer of solid olefin polymer particles from the first loop reactor to the second loop reactor by at least one continuously open settling leg.

15 Claims, 1 Drawing Sheet

(51) Int. Cl.
 *C08F 210/14* (2006.01)
 *C08F 210/16* (2006.01)
 *B01J 19/18* (2006.01)
(58) Field of Classification Search
 USPC .......................................... 526/64; 422/132
 See application file for complete search history.

(56) References Cited

U.S. PATENT DOCUMENTS

| | | | |
|---|---|---|---|
| 7,034,092 B2* | 4/2006 | Marechal | B01J 19/1837 526/124.2 |
| 7,985,378 B2* | 7/2011 | Fouarge | B01J 8/007 137/15.17 |
| 2004/0122187 A1 | 6/2004 | Verser et al. | |
| 2011/0288247 A1 | 11/2011 | Hottovy | |

FOREIGN PATENT DOCUMENTS

| | | |
|---|---|---|
| EP | 0427696 A2 | 5/1991 |
| EP | 0891990 A2 | 1/1999 |
| WO | 0105842 A1 | 1/2001 |
| WO | 2005077994 A1 | 8/2005 |
| WO | 2007096381 A1 | 8/2007 |
| WO | 2011095532 A1 | 8/2011 |
| WO | 2012013804 A1 | 2/2012 |

\* cited by examiner

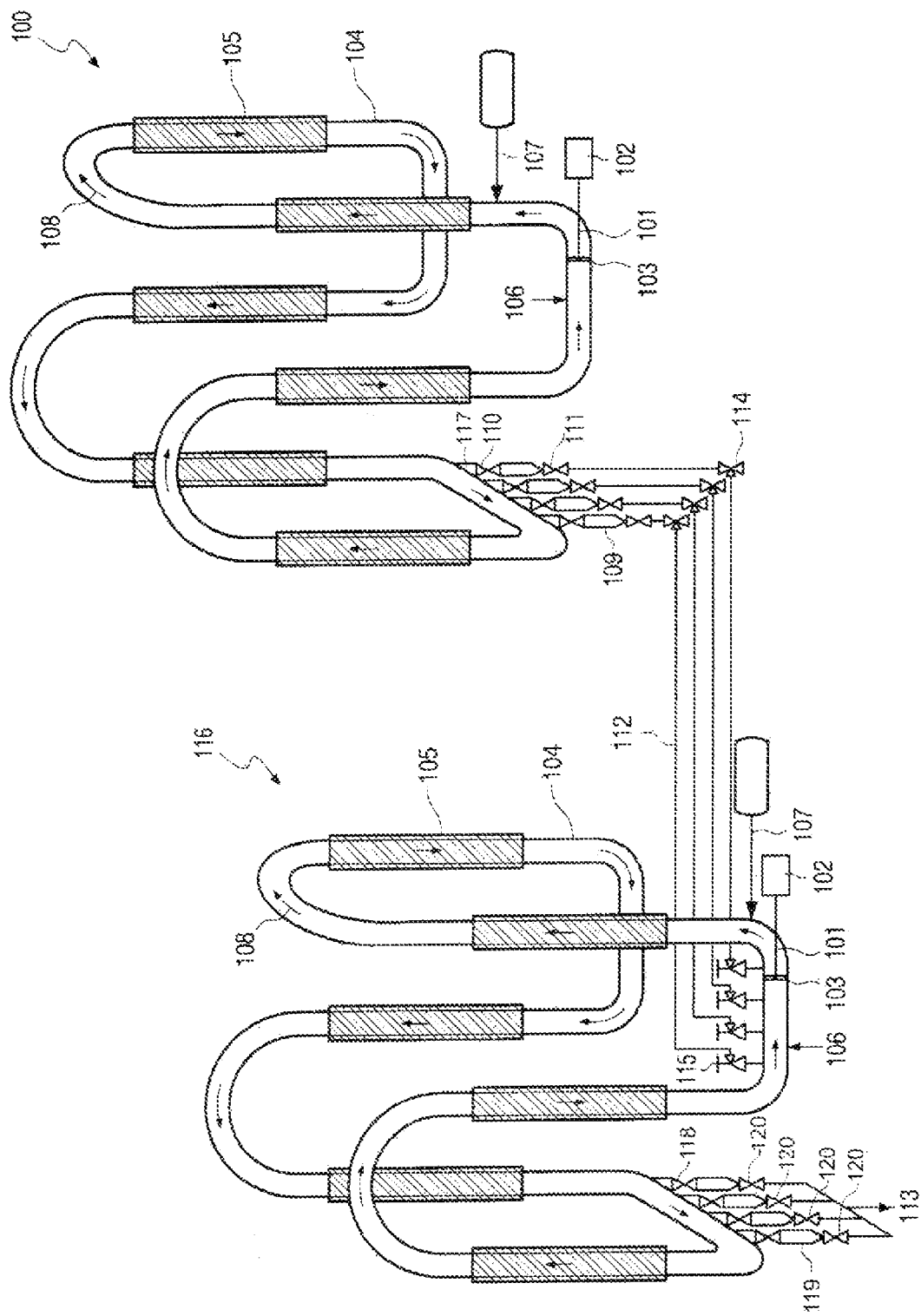

OLEFIN POLYMERIZATION PROCESS WITH CONTINUOUS TRANSFER

CROSS-REFERENCE TO RELATED APPLICATIONS

This application is a Nation Stage Entry of PCT/EP2014/051144, filed on Jan. 21, 2014, which claims priority from EP 13152269.0, filed on Jan. 22, 2013, the entireties of which are incorporated herein by reference.

FIELD OF THE INVENTION

The present invention relates to improvements in the removal of polymer slurry from a reactor for olefin slurry polymerization.

BACKGROUND OF THE INVENTION

Olefin polymerizations such as ethylene polymerization are frequently carried out using monomer, diluent and optional catalyst and optionally co-monomers in a loop reactor. The polymerization is usually performed under slurry conditions, wherein the product consists usually of solid particles and is in suspension of a diluent. The slurry contents of the reactor are circulated continuously with a pump to maintain efficient suspension of the polymer solid particles in the liquid diluent, the product being often taken off by means of settling legs which operate usually on a batch principle to recover the product. Settling in the legs is used to increase the solids concentration of the slurry finally recovered as product slurry. The product is further either transferred to another reactor or discharged to a flash tank, through flash lines, where most of the diluent and unreacted monomers are flashed off and recycled. The polymer particles are dried, additives can be added and finally the polymer is extruded and pelletized.

In these polymerization processes, settling legs, however, do present some problems. They represent the imposition of a "batch" or "discontinuous" technique onto a basic continuous process. Each time a settling leg reaches the stage where it "discharges" or "fires" accumulated polymer slurry it causes interferences on the pressure in the loop reactor, which is thereby not kept constant. Pressure fluctuations in the loop reactor may be larger than 1 bar. At very high monomer concentration, such pressure fluctuations may generate several problems such as the creation of gas bubbles that may cause trouble in the operation of the circulation pump. They may also provoke perturbations in the control scheme of the reactor pressure.

Various alternative product removal techniques are however known. For example, WO 01/05842 describes an apparatus for removing concentrated slurry from a flowing stream of slurry in a conduit characterized by a channel in an outlet area of the conduit, the outlet being adapted to continuously remove slurry.

EP 0891990 describes an olefin polymerization process wherein the product slurry is recovered by means of a continuous product take off, more in particular by means of an elongated hollow appendage provided on the reactor. Said hollow appendage is in direct fluid communication with a heated flash line, and thus being adapted for continuous removal of product slurry.

However the above-described apparatus and processes have the disadvantage that the suspension withdrawn from the reactor still contain a large amount of diluent and of other reactants, such as the monomer, which it is then necessary to subsequently separate from the polymer particles and to treat for the purpose of reusing it in the reactor. Another disadvantage of the above-described apparatus and processes is their lack of flexibility during the phase or reaction start-up or in response to large disruptions in the normal behavior of the reactor, like sudden interruption of one of the feed streams.

WO2011/095532 discloses a process in which settling legs are used for continuous and periodical discharge from a single loop reactor. This document also discloses a process in which two loop reactors are connected in series via settling legs of the first reactor.

It is therefore an object of the present invention to provide a polymerization process occurring in a loop reactor wherein the polymer slurry is efficiently and continuously discharged from the loop reactor and transferred to a subsequent loop reactor. More in particular, it is an object of the invention to optimize the residence time in the settling legs. Another object of the present invention is to improve efficiency of separation of olefin polymer, reactants and diluent. It is further an object of the present invention to improve polymerization process' operability and reliability.

SUMMARY OF THE INVENTION

These present objects are achieved by the processes according to the present invention.

The present invention relates to a process for the preparation of a polyolefin in at least two slurry loop reactors comprising a first loop reactor connected in series with a second loop reactor, comprising the steps of:
introducing one or more olefin reactants, diluents and polymerization catalyst into said first loop reactor, and while circulating said olefin reactants, diluents and polymerization catalyst in said first loop reactor;
polymerizing said one or more olefin reactants to produce a polyolefin slurry comprising essentially liquid diluent and solid olefin polymer particles;
withdrawing polyolefin slurry comprising solid olefin polymer particles and diluent from said first reactor and introducing the withdrawn particles into the second loop reactor, by means of one or more settling legs provided on said first reactor, wherein each settling leg has an inlet connected to the first reactor and an outlet connected to the second reactor by means of a transfer line,
wherein,
at least one settling leg is continuously open allowing continuous transfer of solid olefin polymer particles from said first loop reactor to said second loop reactor, and wherein the process further comprises the step of controlling the continuous transfer of solid olefin polymer particles from said first loop reactor to said second loop reactor by said at least one continuously open settling leg.

Said step of controlling the continuous transfer of solid olefin polymer particles from said first loop reactor to said second loop reactor by said at least one continuously open settling leg comprising the step of controlling the number of continuously open settling legs and/or the step of controlling the flow rate of said at least one continuously open settling leg.

Surprisingly, the present inventors have found that the process according to the present invention improved the operability/reliability by avoiding polymer stagnation and optimizing residence time in the settling legs.

The present process does not require take-off point to be located at specific locations on the first reactor or to have complex shape, and do not need to extend into the circulation path.

The above and other characteristics, features and advantages of the present invention will become apparent from the following detailed description and drawings, which illustrate, by way of example, the principles of the invention.

BRIEF DESCRIPTION OF THE DRAWINGS

FIGURE represents a schematic perspective view of a double loop polymerization reactor.

DETAILED DESCRIPTION OF THE INVENTION

It is to be understood that this invention is not limited to particular process, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to improvements in olefin polymerization process in a loop reactor utilizing a diluent, so to produce product slurry of polymer and diluent. The present invention more in particular relates to a polymerization processes for the production of polymer, wherein product slurry of polymer is continuously discharged from the loop reactor and transferred to a subsequent reactor.

The present invention is applicable to any process producing effluent comprising slurry of particulate polymer solids suspended in a liquid medium comprising a diluent and unreacted monomer. Such reaction processes include those which have come to be known in the art as particle form polymerizations.

Polyolefin polymerization comprises feeding to a loop reactor the reactants including an olefin monomer, optionally one or more co-monomer(s), optionally hydrogen, a diluent, a catalyst, optionally a co-catalyst or activating agent.

As used herein, the term "loop reactor" refers to a closed circuit tubular polymerization reactor for the production of polyolefin, preferably polyethylene or polypropylene. The loop reactor comprises interconnected pipes, defining a continuous flow path for the polyolefin slurry.

Each loop reactor comprises at least two vertical pipes, at least one upper segments of reactor piping, at least one lower segments of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The reactor preferably operates in a liquid full mode.

The present invention encompasses a process for the preparation of a polyolefin in at least two slurry loop reactors comprising a first loop reactor connected in series with a second loop reactor, said process comprising the steps of:
  introducing one or more olefin reactants, diluents and polymerization catalyst into said first loop reactor, and while circulating said olefin reactants, diluents and polymerization catalyst in said first loop reactor;
  polymerizing said one or more olefin reactants to produce a polyolefin slurry comprising liquid diluent and solid olefin polymer particles;
  withdrawing polyolefin slurry comprising solid olefin polymer particles and diluent from said first reactor and introducing the withdrawn particles into the second loop reactor, by means of one or more settling legs provided on said first reactor, wherein each settling leg has an inlet connected to the first reactor and an outlet connected to the second reactor by means of a transfer line,
  wherein
at least one settling leg is continuously open allowing continuous transfer of solid olefin polymer particles from said first loop reactor to said second loop reactor.

The produced polymer slurry may be continuously transferred via one or more settling legs, more specifically via at least one continuously open settling leg to the transfer line and further on to the second or subsequent loop reactor.

As used herein the term "continuously open settling leg" refers to a settling leg, which while in use, is open continuously to allow continuous discharge from the loop reactor and out of the settling leg and is only closed when it is taken out of service. With preference, the closing and/or opening of the settling leg is performed by a bulk valve (or isolation valve) provided at the inlet of said settling leg or provided on a transfer conduit connecting connect the first loop reactor with the inlet of the settling leg.

The process according to the present invention is applicable to the double loop reactors as well as multiple loop reactors. The continuous transfer is performed in the first and/or any subsequent loop reactors but not in the last loop reactor in the series. When the process is performed in a double loop reactor comprising two loop reactors connected in series, the transfer is performed by means of at least one continuously open settling leg connected to the first loop reactor of the series. When the process is performed in multiple loop reactors connected in series, the transfer is performed by means of at least one continuously open settling leg provided on the first and/or any subsequent loop reactors in series but not in the last loop reactor. Discharge from the last loop reactor into a product recovery zone can done in a conventional way, e.g. discharge of the polymer slurry is sequential or in batches or continuously, through settling legs or any other suitable mean.

By keeping at least one settling leg continuously open, the process allows minimizing the influence of operating conditions in upstream reactor on the downstream reactor.

The process according to the present invention comprises the step of maintaining a continuous transfer of polymer slurry out of said first and/or any subsequent loop reactor and transferring it to a subsequent and/or last loop reactor by continuously transferring through at least one continuously open settling leg. The present inventors have found that such a set up allowed the system to operate without any flow/pressure control system on the transfer lines.

The process of the invention further comprises the step of controlling the continuous transfer of solid olefin polymer particles from said first loop reactor to said second loop reactor by said at least one continuously open settling leg, said step comprises:
 the step of controlling the number of continuously open settling legs, and/or
 the step of controlling the flow rate of said at least one continuously open settling leg.

In an embodiment, the outlet of at least one settling leg, preferably of each settling legs, is provided with a control valve, so that the outlet of the settling leg can be completely or partially open. In another embodiment, the outlet of at least one settling leg is completely open.

Preferably, the step of controlling the continuous transfer of solid olefin polymer particles from said first loop reactor to said second loop reactor by at least one continuously open settling leg comprises monitoring one or more parameters selected from ratio between polymer solids and reactants transferred into the second loop reactor, ratio between polymer solids and diluent transferred into the second loop reactor, the residence time of polymer solids in the settling legs, and combinations thereof. For example, the ratio monitored is the ratio between polymer solids and both diluents and reactants. In an embodiment, said monitoring is a continuous monitoring.

In an embodiment, the step of controlling the continuous transfer of solid olefin polymer particles from said first loop reactor to said second loop reactor by at least one continuously open settling leg comprises one or more of
 i) lowering the volumetric flow rate of the polyolefin slurry transferred from said first loop reactor to said second loop reactor when:
  the ratio between polymer solids and reactants transferred into the second loop reactor is lower than a first predetermined value; and/or
  the ratio between polymer solids and diluent transferred into the second loop reactor is lower than a first predetermined value; and/or
  the residence time of polymer solids in the settling legs is lower than a first predetermined value;
 ii) raising the volumetric flow rate of the polyolefin slurry transferred from said first loop reactor to said second loop reactor when:
  the ratio between polymer solids and reactants transferred into the second loop reactor is higher than a second predetermined value; and/or
  the ratio between polymer solids and diluent transferred into the second loop reactor is higher than a second predetermined value; and/or
  the residence time of polymer solids in the settling legs is higher than a second predetermined value.

The first and the second predetermined value can be the same or different for one or more parameters selected from ratio between polymer solids and reactants transferred into the second loop reactor, ratio between polymer solids and diluent transferred into the second loop reactor, the residence time of polymer solids in the settling legs, and combinations thereof. When the first and second predetermined value are different it is defined a working widow in which a defined volumetric flow rate of polyolefin slurry is transferred from said first loop reactor to said second loop reactor. When the first predetermined value is the same that the second predetermined value, it is preferred that the modification of the volumetric flow rate of polyolefin slurry transferred is performed after a predetermined time and if the monitored parameter(s) change is maintained.

It is understood that any modification of the volumetric flow rate of the polyolefin slurry transferred from said first loop reactor to said second loop reactor, will result in modification in the residence time of polymer solids in the settling legs and thereof of the ratio between polymer solids and reactants and/or diluent.

It is also understood that according to the invention, the polyolefin slurry transferred from said first loop reactor to said second loop reactor has a ratio between polymer solids and diluent and/or reactants which higher than the polyolefin slurry in the first reactor due to the action of the settling leg. Thus, the inventive process continuously transfers a polyolefin slurry enriched in polymer solids compared to known process where a mere continuous take off is provided to transfer the polyolefin slurry from one reactor to another. According to a preferred embodiment, the invention provides a process that further comprises the step of controlling the number of continuously open settling legs. As a result, the number of the continuously open settling legs may vary, provided that at least one settling leg is continuously open.

It is understood from the above that a change in the number of the continuously open settling leg results in a variation of the volumetric flow rate of the polyolefin slurry transferred from the first reactor to the second or subsequent reactor, where the first reactor comprises at least two settling legs. Indeed in an embodiment, raising the volumetric flow rate of the polyolefin slurry transferred from said first loop reactor to said second loop reactor comprises raising the number of continuously open settling legs, and/or lowering the volumetric flow rate of the polyolefin slurry transferred from said first loop reactor to said second loop reactor comprises lowering the number of continuously open settling legs.

According to another preferred embodiment, the invention provides a process that further comprises the step of controlling the flow rate of at least one continuously open settling leg. As a result, the volumetric flow rate of at least one continuously open settling leg may vary.

In a preferred embodiment, the outlet of at least one continuously open settling leg is provided with a control valve which is continuously open and in that said control valve is used to adjust the volumetric flow rate of said continuously open settling leg. The volumetric flow rate is adjusted by the outlet control valve being completely or partially open.

It is understood from the above that a change in the opening of the control valve of at least one continuously open settling leg results in a variation of the volumetric flow rate of the polyolefin slurry transferred from the first reactor to the second or subsequent reactor where the first reactor comprises at least two settling legs, but also where the first reactor comprises only one settling leg.

Indeed in an embodiment, raising the volumetric flow rate of the polyolefin slurry transferred from said first loop reactor to said second loop reactor comprises raising the opening of the outlet control valve of at least one continuously open settling leg, and/or lowering the volumetric flow rate of the polyolefin slurry transferred from said first loop reactor to said second loop reactor comprises lowering the opening of the outlet control valve of at least one continuously open settling leg.

According to another preferred embodiment, the invention provides a process that further comprises both steps of controlling the number of continuously open settling legs and of controlling the flow rate of said at least one continuously open settling leg. Said steps are performed at the same time or sequentially.

Preferably, and in order to prevent clogging, the process of the invention perform in priority the step allowing the volumetric flow rate of the polyolefin slurry transferred from said first loop reactor to said second loop reactor by at least one continuously open settling leg being maximal. This means, where outlet control valve is considered, that the process will preferably perform any step allowing keeping the outlet control valve completely open or with the maximum of opening before modifying the number of settling legs to be continuously open. For example if the volumetric flow of polyolefin transferred from said first loop reactor to said second loop reactor is to be raised, the process according to the invention comprises in a first step raising the opening of the outlet control valve of at least one continuously open settling leg, and if necessary a second step of raising the number of continuously open settling legs. However, the inverse is also possible.

In an embodiment, each inlet of said settling legs is connected to the first reactor by means of one transfer conduit provided with a bulk valve and a continuously open settling leg is a settling leg having its inlet bulk valve opened.

In an embodiment, each inlet of said settling legs is connected to said first reactor by means of one transfer conduit. In an embodiment, one or more flushing system is provided in each settling leg. For example the flushing system, can be an isobutane flushing system, preferably to provide flushing when said settling leg is taken out of service. In another example, and in embodiments where the continuously open settling leg is provided with an outlet control valve which is partially open, the opening of said outlet is increased periodically for defined period of time and for a specified frequency. This is done to prevent any clogging to secure continuous discharge.

In an embodiment, the increased opening of the outlet control valve is periodically performed during one to three seconds every one to five hours; preferably the periodically increased opening of the pressure control device is performed one second every two hours.

In an embodiment, said first loop reactor is provided with two or more settling legs.

In an embodiment, at least two settling legs are continuously open allowing continuous withdrawal and transfer of said slurry from said first loop reactor to said second loop reactor.

In an embodiment, the process further comprises the step of controlling the flow distribution among the continuously open settling legs.

Preferably the step of controlling the flow distribution among the continuously open settling legs comprises:
  i) monitoring flow from each settling leg, wherein said monitored flow is selected from flow of reactants to the subsequent reactor, flow of diluent to the subsequent reactor, flow of polymer solids to the subsequent reactor, the total flow transferred to the subsequent reactor, and combination thereof, and
  ii) adjusting the monitored flow of at least one settling leg, the outlet of said settling leg being provided with a valve which is continuously open and in that said valve is used to adjust the flow of said settling leg.

Opening of the control valves can be also be defined independently for each settling leg by continuously monitoring flows from each settling leg.

In another embodiment, said one or more continuously open settling leg can be provided on a bypass pipe provided on the first loop reactor. In this embodiment, the first loop reactor can comprises interconnected pipes defining a reactor main path, and further comprises on said interconnected pipes one or more by-pass pipes connecting two points of the same loop by an alternate path having a different transit time than that of the main path, and said one or more settling leg is provided on said by-pass pipe.

In an embodiment of the invention, the first loop reactor is provided with two or more settling leg and at least one settling leg is continuously open and at least one settling leg is operated in a discontinuous mode.

The process according to the present invention provides several advantages over the prior art including: it avoids or minimizes intermittent pulses in the reactor and the risk of settling leg and downstream clogging; moreover it avoids instrumental problems and makes process simpler; minimizes quantities of reactants transferred between upstream and downstream rectors and allows or improves required control for the operating conditions in downstream reactor; the product take off point does not need to be located at a specific place in the reactor; improved efficiency of the process; and simplified operation of the process.

More in particular, the present invention relates to a polymerization process for the manufacture of particulate olefin polymers comprising the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene pentene, butadiene, isoprene, 1-hexene and the like.

Preferably, the polyolefin compositions are processed at a temperature above the melt temperature, i.e. they are melt-processed. The polymerization reaction can be carried out at a temperature of from 50 to 120° C., preferably at temperature of from 70 to 115° C., more preferably at temperature of from 75 to 110° C., and at a pressure of from 20 to 100 bars, preferably at pressure of from 30 to 50 bars, more preferably at pressure of 37 to 45 bars.

In a preferred embodiment, the present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene.

The olefin such as ethylene polymerizes in a liquid diluent in the presence of a catalyst, optionally a co-catalyst, optionally co-monomer, optionally hydrogen and optionally other additives, thereby producing polymerization slurry.

As used herein, the term "polymerization slurry" "polyolefin slurry", "slurry", or "polymer slurry" means substantially a multi-phase composition including at least polymer solid particles and a liquid phase, the liquid phase being the continuous phase. The solids include catalyst and polymerized olefin, such as polyethylene. The liquids include an inert diluent, such as isobutane, with dissolved monomer such as ethylene and optionally, one or more co-monomers, molecular weight control agents, such as hydrogen, antistatic agents, antifouling agents, scavengers, and other process additives.

Suitable "olefin polymerization" includes but is not limited to homo-polymerization of an olefin or co-polymerization of an olefin monomer and at least one olefin co-monomer. The term "homo-polymer" refers to a polymer which is made by linking olefin monomers, in the absence of co-monomers. The term "co-polymer" refers to a polymer, which is made by linking two different types of monomers in the same polymer chain.

When using at least two loop reactors connected in series for the preparation of a polyolefin, a monomodal or multimodal polyolefin may be prepared.

By the term "monomodal polyolefin" or "polyolefin with a monomodal molecular weight distribution" it is meant, polyolefins having one maximum in their molecular weight distribution curve defined also as unimodal distribution curve. By the term "polyolefin with a bimodal molecular weight distribution" or "bimodal polyolefin" it is meant, polyolefins having a distribution curve being the sum of two unimodal molecular weight distribution curves. The term "multimodal" refers to the "multimodal molecular weight distribution" of a polyolefin, having two or more distinct but possibly overlapping populations of polyolefin macromolecules each having different weight average molecular weights. By the term "polyolefin with a multimodal molecular weight distribution" or "multimodal" polyolefin it is meant polyolefin with a distribution curve being the sum of at least two, preferably more than two unimodal distribution curves. By the term "monomodal polyethylene" or "polyethylene with a monomodal molecular weight distribution" it is meant, polyethylene having one maxima in their molecular weight distribution curve defined also as unimodal distribution curve. By the term "polyethylene with a multimodal molecular weight distribution" or "multimodal" polyethylene product it is meant polyethylene with a distribution curve being the sum of at least two, preferably more than two unimodal distribution curves.

In a preferred embodiment, said polyolefin has a multimodal molecular weight distribution, preferably a bimodal molecular weight distribution.

Suitable diluents (as opposed to solvents or monomers) are well known in the art and include hydrocarbons which are inert or at least essentially inert and liquid under reaction conditions. Suitable hydrocarbons include isobutane, n-butane, propane, n-pentane, isopentane, neopentane, isohexane and n-hexane, with isobutane being preferred.

Suitable catalysts are well known in the art. Examples of suitable catalysts include but are not limited to chromium oxide such as those supported on silica, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

In some embodiments, the at least one polyolefin is prepared in the presence of a catalyst selected from the group comprising metallocene catalysts, chromium catalysts, and Ziegler-Natta catalysts.

The term "Ziegler-Natta catalyst" or "ZN catalyst" refers to catalysts having a general formula $M^1X_v$, wherein $M^1$ is a transition metal compound selected from group IV to VII from the periodic table of elements, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$ and $TiCl_4$. Suitable ZN catalysts for use in the invention are described in U.S. Pat. No. 6,930,071 and U.S. Pat. No. 6,864,207, which are incorporated herein by reference.

The term "metallocene catalyst" is used herein to describe any transition metal complexes consisting of metal atoms bonded to one or more ligands. The metallocene catalysts are compounds of Group 4 transition metals of the Periodic Table such as titanium, zirconium, hafnium, etc., and have a coordinated structure with a metal compound and ligands composed of one or two groups of cyclo-pentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

$$(Ar)_2MQ_2 \qquad (I); or$$

$$R^1(Ar)_2MQ_2 \qquad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogens, a hydrosilyl, a $SiR^2_3$ group wherein $R^2$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogens; a hydrocarboxy having 1 to 20 carbon atoms; and a hydrocarbyl having 1 to 20 carbon atoms, wherein said hydrocarbyl optionally contains one or more atoms selected from the group comprising B, Si, S, O, F, Cl and P; and wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogens, a hydrosilyl, a $SiR^3_3$ group wherein $R^3$ is a hydrocarbyl having 1 to 20 carbon atoms, and a hydrocarbyl having 1 to 20 carbon atoms, wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

The term "hydrocarboxy having 1 to 20 carbon atoms" refers to a radical having the formula —O—$R_a$ wherein $R_a$ is hydrocarbyl having 1 to 20 carbon atoms. Preferred hydrocarboxy groups are alkoxy groups. The term "alkoxy" or "alkyloxy" as used herein refers to a radical having the formula —O—$R_b$ wherein $R_b$ is alkyl. Non-limiting examples of suitable alkoxy groups include methoxy, ethoxy, propoxy, isopropoxy, butoxy, isobutoxy, sec-butoxy, tert-butoxy, pentyloxy, amyloxy, hexyloxy, heptyloxy and octyloxy. Preferred hydrocarboxy groups are methoxy, ethoxy, propoxy, butoxy, and amyloxy.

As used herein, the term "alkyl" by itself or as part of another substituent, refers to a straight or branched saturated hydrocarbon radical group joined by single carbon-carbon bonds having 1 or more carbon atoms, for example 1 to 20 carbon atoms, for example 1 to 12 carbon atoms, for example 1 to 6 carbon atoms, for example 1 to 4 carbon atoms, for example 2 to 3 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of $C_{1-12}$alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{3-20}$ cycloalkyl", by itself or as part of another substituent, refers to a saturated or partially saturated cyclic alkyl radical containing from 3 to 20 carbon atoms. Examples of $C_{3-20}$ cycloalkyl include cyclopropyl, cyclobutyl, cyclopentyl, cyclohexyl, cycloheptyl and cyclooctyl.

As used herein, the term "$C_{6-20}$ aryl", by itself or as part of another substituent, refers to a polyunsaturated, aromatic hydrocarbyl group having a single ring (i.e. phenyl) or multiple aromatic rings fused together (e.g. naphthalene), or linked covalently, typically containing 6 to 20 carbon atoms; wherein at least one ring is aromatic. Examples of $C_{6-20}$ aryl include phenyl, naphthyl, indanyl, biphenyl, or 1,2,3,4-tetrahydro-naphthyl.

The term "arylalkyl", as a group or part of a group, refers to an alkyl as defined herein, wherein one or more hydrogen atoms are replaced by an aryl as defined herein. Examples of arylalkyl radicals include benzyl, phenethyl, dibenzylmethyl, methylphenylmethyl, 3-(2-naphthyl)-butyl, and the like.

As used herein, the term "alkylaryl", by itself or as part of another substituent, refers to an aryl group as defined herein, wherein one or more hydrogen atoms are replaced by an alkyl as defined herein.

In an embodiment, the polymerization can be carried out in the presence of a metallocene comprising a bridged bis-indenyl and/or a bridged bis-tetrahydrogenated indenyl catalyst component. The metallocene can be selected from one of the following formula (IIIa) or (IIIb):

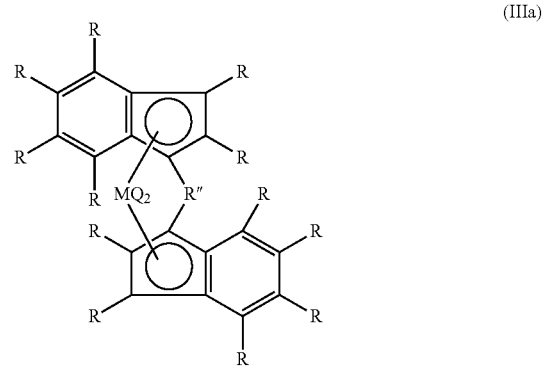

(IIIa)

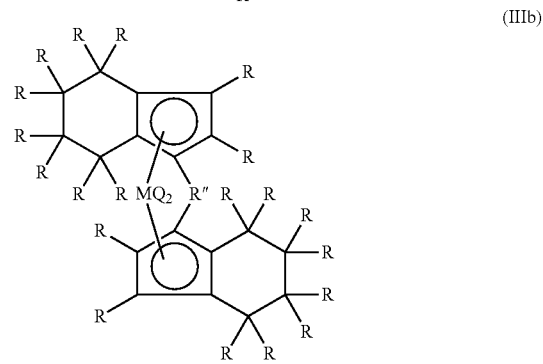

(IIIb)

wherein each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls to impart stereorigidity that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene[1-(4-tert-butyl-2-methyl-cyclopentadienyl)](fluoren-9-yl) zirconium dichloride.

More preferably, the metallocene comprises a bridged unsubstituted bis-tetrahydrogenated indenyl. Most preferably the metallocene is ethylene-bis(tetrahydroindenyl)zirconium dichloride or ethylene-bis(tetrahydroindenyl) zirconium difluoride.

The metallocene catalysts can be provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support.

In an embodiment, the catalyst is used in the presence of a co-catalyst. The term "co-catalyst" is used interchangeably with the term "activating agent" and both terms refer to materials that can be used in conjunction with a catalyst in order to improve the activity of the catalyst during the polymerization reaction.

Suitable co-catalyst, can be compounds such as an aluminium-containing co-catalyst, a boron-containing co-catalyst, and the like.

Examples of aluminium-containing co-catalysts include, among other, dialkyl or trialkyl aluminoxane, dialkyl or trialkyl aluminoxane halide. The aluminoxane component of the aluminium-containing co-catalysts may be selected from methylaluminoxane, ethylaluminoxane, n-butylaluminoxane, and isobutylaluminoxane. Examples of boron-containing co-catalysts include, among other, trityl borate, fluorinated borane, and anilinium borate. Suitable boron-containing co-catalysts may also comprise a triphenylcarbenium boronate such as tetrakis-pentafluorophenyl-borato-triphenylcarbenium as described in EP 0427696, or those of the general formula [L'-H]+ [BAr1Ar2X3X4]- as described in EP 0277004 (page 6, line 30 to page 7, line 7).

The alumoxanes (also referred as aluminoxanes) that may be used in the process of the present invention are well known by the person skilled in the art and preferably comprise oligomeric linear and/or cyclic alkyl alumoxanes represented by the formula:

for oligomeric, linear alumoxanes and

for oligomeric, cyclic alumoxane, wherein n is 1-40, preferably 10-20, m is 3-40, preferably 3-20 and $R^{10}$ is a C1-C8 alkyl group and preferably methyl.

In one embodiment, the aluminoxane is methylaluminoxane, ethylaluminoxane, n-butylaluminoxane, or isobutylaluminoxane.

In an embodiment, the catalyst used for preparing the polyolefin is a supported metallocene-alumoxane catalyst comprising a metallocene and an alumoxane which are bound on a porous silica support.

The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

Optionally, other activating agent may be used in polymerization processes. The term "activating agent" refers to materials that can be used in conjunction with a catalyst in order to improve the activity of the catalyst during the polymerization reaction. A non-limiting example of an activating agent is an organo-aluminium compound, being optionally halogenated, having general formula $AlR^{11}R^{12}R^{13}$ or $AlR^{11}R^{12}Y^2$, wherein $R^{11}$, $R^{12}$, $R^{13}$ is an alkyl having from 1 to 6 carbon atoms and $R^{11}$, $R^{12}$, $R^{13}$ may be the same or different and wherein $Y^2$ is hydrogen or a halogen, as disclosed in U.S. Pat. No. 6,930,071 and U.S. Pat. No. 6,864,207, which are incorporated herein by reference. Other activating agents include Tri-Ethyl Aluminum (TEAl), Tri-Iso-Butyl Aluminum (TIBAl), Tri-Methyl Aluminum (TMA), and Methyl-Methyl-Ethyl Aluminum (MMEAl).

The polymerization slurry is maintained in circulation in the loop reactor comprising vertical jacketed pipe sections connected through elbows. The polymerization heat can be extracted by means of cooling water circulating in the jacket of the reactor.

The produced polymer is transferred continuously according to the process of the present invention from the first loop reactor and/or any subsequent loop reactor along with some diluent through one or more settling legs, wherein at least one settling leg is continuously open and in which the solid content is increased with respect to its concentration in the body of the reactor and transferred to a subsequent loop reactor.

According to an embodiment of the present invention, the rate of continuous transfer of the polymer slurry is such as to allow continuously and substantially uninterrupted outgoing flow from the first loop reactor (from the points of discharge of the polymer slurry through at least one continuously open settling leg to the subsequent loop reactor) equal to the in-going flow of feeds to the loop reactor.

As used herein the term "substantially uninterrupted" refers to a flow that can be interrupted no more than 5% of the time, preferably no more than 2% of the time, even more preferably no more than 0.5% of the time and most preferably there is no interruptions.

The rate of continuous transfer of the polymerization slurry out of the reactor and into a subsequent loop reactor is such as to maintain operating conditions as constant as possible in the loop reactor and to eliminate intermittent low-pressure pulses associated with a more important and more sudden discharge of a portion of the reactor contents that occurs with the conventional batch operating settling legs on slurry reactors.

The process according to the present invention comprises the steps of: (i) polymerizing olefin monomer, optionally a comonomer, in the presence of a catalyst, diluent, and optional reactants in the first reactor to produce a first olefin polymer fraction, (ii) feeding the first olefin polymer fraction thereby produced, to the second reactor serially connected to the first reactor, by the means of at least one settling legs, one of which being continuously open, each legs being connected to the second reactor by means of a transfer line, and in the second reactor polymerizing olefin monomer and optionally a comonomer in the presence of the first olefin polymer fraction thereby producing the polyolefin product; with the proviso that the transfer lines are free of any flow and/or pressure control devices.

Referring now to the drawings, FIGURE schematically illustrates an example of a double loop reactor.

FIGURE represents two single loop reactors 100, 116, which are interconnected in series. Loop reactor 100 is first loop reactor in series and loop reactor 116 is subsequent loop reactor in series or second loop reactor. Both reactors 100, 116 comprise a plurality of interconnected pipes 104. The vertical sections of the pipe segments 104 are preferably provided with heat jackets 105. Reactants are introduced into the reactors 100 and 116 by line 107. Catalyst, optionally in conjunction with a co-catalyst or activation agent, may be injected in one or both of the reactors 100 and 116 by means of conduit 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with set of rotating impellers 103. The first reactor 100 is provided with one or more settling legs 109 connected to the pipes 104 of said reactor 100. In an embodiment, each settling leg is connected to the pipes of said loop reactor 100 by means of a transfer conduit 117. The settling legs 109 of the first reactor 100 function according to the present invention. Therefore, at least one settling leg 109 is continuously open and allows continuous discharge of the polymer slurry to be transferred to the subsequent loop reactor 116.

In an embodiment, said settling leg outlet might be connected to a common collector to the subsequent reactor. In an embodiment, said collector can be a bypass line of the subsequent reactor as described in WO2007/096381. In another embodiment, said one or more continuously open settling leg is connected via a transfer line to at least one bypass pipe provided on the second loop reactor. In this embodiment, the second loop reactor can comprises interconnected pipes defining a reactor main path, and further comprises on said interconnected pipes one or more by-pass pipes connecting two points of the same loop by an alternate path having a different transit time than that of the main path, and wherein the transfer line from the first loop reactor is connected to said one or more by-pass pipes.

The settling legs 109 are preferably provided with a bulk valve 110 (or isolation valve). These bulk valves 110 may be ball valves for example. At least one of the bulk valves 110 is continuously open and can be closed for example to isolate a settling leg from operation. Said valves can be closed when the reactor pressure falls below a chosen value. In an embodiment at least two settling legs have bulk valves 110 continuously open for continuous transfer of the settled polymer to the second reactor 116. Further the outlet of each of the settling legs of the reactor 100 can be provided with optional valves 111, which are continuously open. The optional valves 111 can be used as pressure and/or flow control devices.

Non limiting examples of suitable optional control devices 111 to be used in the present invention are control valves such as v-ball valves as described in the US2004122187 and Eccentric plug control valves (referred as rotary globes) such as Camflex or MaxFlo valves. These valves offer conventional globe valve dynamic performance in a rotary package. These valves have advantage in their rotary and globe valve designs, and therefore, provide excellent throttling controllability in a broad range of applications and accommodate the polymer slurry flow.

In one embodiment the control device opening is increased periodically for defined period of time. This is done to prevent any clogging to secure continuous discharge.

The reactor 100 is provided with one or more settling legs 109 connected to the pipes 104 of the reactor 116. Although only four settling legs are illustrated in FIGURE, the present processes encompasses loop reactor comprising one or more settling legs. In an embodiment of the present invention, said loop reactor comprise 1 to 20 settling legs, preferably 4 to 12 settling legs, for examples 6 to 10 settling legs, preferably said reactor comprises at least 1 to 6 continuously open settling legs.

In a preferred embodiment, the settling legs 109 and transfer lines 112 of the reactor 100 according to the present invention operate without any flow or pressure control devices. However, in another embodiment, said settling legs and/or transfer line comprise an optional valve which is used as pressure and/or flow control device.

Downstream exit of the settling leg 109 of the first reactor 100, is connected to a transfer line 112 which allows continuous transfer of the discharged polymer slurry via at least one continuously open settling leg 109 to the subsequent reactor 116. The transfer line 112 operates without any flow control or pressure control systems. The transfer line 112 may preferably have a piston valve 115. Along the transfer line 112, an optional three-way valve 114 may divert the flow to a product recovery zone if the multiple loop reactors have to be used in a parallel configuration. The polymer slurry can be discharged from the subsequent reactor 116 by any conventional way e.g. discharge of polymer slurry is sequential or in batches via settling legs 119 to the one or more product recovery lines 113, e.g. to a product recovery zone. The settling legs 119 can be provided with a bulk valve 118. Settling legs 119 of the subsequent loop reactor 116 comprise control valves 120. The valves 120 may be any type of valve, which can permit discharge of the polymer slurry to a product recovery section. An angle valve or ball valves may be suitably used. For example, the valve may have such a structure that solid matter is prevented from accumulating or precipitating at the main body portion of the valve. However, the type and structure of the pressure control device can be selected by those skilled in the art as required. The actuation and the control of the discharging can be implemented using electrical analog, digital electronic, pneumatic, hydraulic, mechanical or other similar types of equipment or combinations of one or more such equipment types. A computational means is used in the preferred embodiment of the present invention to operate and control the process parameters. Computers or other types of controlling devices can be used in the invention. In an embodiment, the outlet of each settling leg can be connected to a discharge conduit provided with flow or/and pressure control device. The pressure and/or flow control devices may be any type of device, which can permit continuous discharge of polymer slurry, while providing pressure and/or flow control.

As used herein "product recovery zone" or "recovery section" includes but is not limited to heated or not heated flash lines, flash tank, cyclones, filters, conduits and general transfer lines and the associated vapor recovery and solids recovery systems.

The discharged slurry may be depressurized and transferred through for example heated or not heated flash lines to a flash tank where the polymer and the unreacted monomer and/or co-monomer and diluent are separated. The degassing of the polymer may be further completed in a purge column.

In an embodiment of the present invention, the continuous discharging and transfer from the first reactor and/or any previous reactor to a subsequent reactor is obtained by keeping defined number of settling legs open thereby maintaining a continuous flow of discharged polymer slurry out of said reactor.

The number of continuously open settling legs can be controlled continuously by monitoring relevant parameters for optimum operation of the settling leg. Examples of such parameters are for example ratio between polymer solids and reactants/diluent transferred into second or subsequent loop reactor and the residence time of polymer solids in the settling legs. Low ratio between polymer solids and reactants/diluents transferred into second or subsequent loop reactor will trigger more continuously open settling legs to be taken into the service. Whereas, long residence time of polymer solids in the settling legs will trigger lower number of continuously open settling legs to be taken into the service.

According to the present invention at least one settling leg of the first loop reactor is kept continuously open. Preferably one to six settling legs are kept continuously open, for example one, two, three, four, five or six settling legs are kept continuously open, more preferably one to four settling legs are kept continuously open.

A continuously open settling leg encompasses a settling leg which has its bulk valve completely open and the settling leg outlet is continuously open, the settling leg outlet may be completely open or provided with a control valve to allow being completely or partially open.

In an embodiment of the present invention, at least two settling legs are kept continuously open.

In the process according to the present invention, the continuously open settling leg or the settling legs which are in service in the first loop reactor are open and all remaining settling legs which are out of service are closed. For example, if the reactor comprises six settling legs and that one settling leg is continuously open, then the other five legs are closed (or out of service). For example if the reactor comprises six settling legs and two legs are continuously open, then the other four legs are closed; etc.

The flow distribution among settling legs, when more than one settling leg is continuously open, can be controlled by monitoring flows in each settling leg. Examples for such flows are flow of reactants/diluent, flow of polymer solids, the total flow transferred from each settling legs to the subsequent reactor. Sensors can be used to monitor the flows, wherein said sensors can be located in the settling legs or discharge/transfer conduits.

According to the present invention, the number of continuously open settling legs is adjusted and synchronized by computational means or other type of controlling devices.

The process according to present invention may optionally comprise at least one flushing system attached to the each settling legs, to provide flushing when said settling leg is taken out of service.

It has been observed that by continuously transferring polymer slurry from the first and/or any previous loop reactor to the subsequent loop reactor according to the present invention, higher weight percent solids can be transferred from the first and/or any previous loop reactor. Typically polymer solid concentration in the loop reactor is from about 40 wt % to about 50 wt % and polymer solid concentration into the second reactor is from about 50 wt % to about 65 wt %.

In addition the present invention enables continuous transfer of the polymer slurry from the first and/or any previous loop reactor through at least one continuously open settling leg allows improved efficiency on separation of the polymer, the reactants and the diluent by minimizing amount of reactants and diluent transferred into second/subsequent loop reactor. Moreover, this helps on separating working conditions between the first and any subsequent loop reactors. Furthermore, the continuous discharge and transfer according to the present invention does not require specific location for the product take off point. In addition the present invention enables to establish non-fluctuating reaction conditions in a reactor during a polymerization process. Furthermore, the process according to the present invention also improves operability and reliability of the polymerization process by avoiding polymer stagnation. Furthermore, residence time in the settling legs is optimized.

EXAMPLES

An ethylene-hexene copolymer has been produced in presence of a metallocene catalyst inside a double-loop reactor with various configurations of the transfer section to the second reactor. The results are summarized in the following table:

| Reactor discharge | Number of settling legs | Settling legs diameter | Average polymer solids concentration in loop reactor | Average polymer solids concentration to recovery sections | Reduction of diluent/reactants flow to downstream reactor (per ton of polymer produced) versus comparative example |
|---|---|---|---|---|---|
| Continuous discharge | — | — | 41 wt-% | 41 wt-% | comparative example |
| Continuous discharge | 1 (continuously open settling leg) | 6" | 41 wt-% | 51 wt-% | −33% |
| Discontinuous discharge | 2 | 6" | 41 wt-% | 54 wt-% | −41% (comparative example) |

Although the present invention has been described with considerable detail with reference to certain preferred variations thereof, other variations are possible. Therefore, the spirit and scope of the appended claims should not be limited to the preferred variations described herein.

The invention claimed is:

1. A process for the preparation of a polyolefin in at least two slurry loop reactors comprising a first loop reactor connected in series with a second loop reactor, the process comprising the steps of:
introducing one or more olefin reactants, diluents and polymerization catalyst into said first loop reactor, and while circulating said olefin reactants, diluents and polymerization catalyst in said first loop reactor;
polymerizing said one or more olefin reactants to produce a polyolefin slurry comprising liquid diluent and solid olefin polymer particles;
withdrawing polyolefin slurry comprising solid olefin polymer particles and diluent from said first loop reactor and introducing the withdrawn solid olefin polymer particles into the second loop reactor by means of one or more settling legs provided on said first loop reactor, wherein each settling leg has an inlet connected to the first loop reactor and an outlet connected to the second loop reactor by means of a transfer line;
characterized in that at least one settling leg is continuously open allowing continuous transfer of solid olefin polymer particles from said first loop reactor to said second loop reactor, and in that the process further comprises the step of controlling the continuous transfer of solid olefin polymer particles from said first loop reactor to said second loop reactor by at least one continuously open settling leg;
wherein the step of controlling the continuous transfer of solid olefin polymer particles from said first loop reactor to said second loop reactor by at least one continuously open settling leg comprises the step of controlling the number of continuously open settling legs and/or the step of controlling the flow rate of said at least one continuously open settling leg, and monitoring one or more parameters selected from ratio between polymer solids and reactants transferred into the second loop reactor, ratio between polymer solids and diluent transferred into the second loop reactor, the residence time of polymer solids in the one or more settling legs, and combinations thereof.

2. The process according to claim 1, characterized in that the outlet of at least one settling leg is provided with a control valve, so that the outlet of the settling leg can be completely or partially open.

3. The process of claim 1, wherein the monitoring one or more parameters is a continuous monitoring.

4. The process of claim 1, characterized in that the step of controlling the continuous transfer of solid olefin polymer particles from said first loop reactor to said second loop reactor by at least one continuously open settling leg comprises one or more of:
i) lowering the volumetric flow rate of the polyolefin slurry transferred from said first loop reactor to said second loop reactor when:
the ratio between polymer solids and reactants transferred into the second loop reactor is lower than a first predetermined value; and/or
the ratio between polymer solids and diluent transferred into the second loop reactor is lower than a first predetermined value; and/or
the residence time of polymer solids in the settling legs is lower than a first predetermined value;
ii) raising the volumetric flow rate of the polyolefin slurry transferred from said first loop reactor to said second loop reactor when:
the ratio between polymer solids and reactants transferred into the second loop reactor is higher than a second predetermined value; and/or
the ratio between polymer solids and diluent transferred into the second loop reactor is higher than a second predetermined value; and/or
the residence time of polymer solids in the settling legs is higher than a second predetermined value.

5. The process according to claim 4, characterized in that raising the volumetric flow rate of the polyolefin slurry transferred from said first loop reactor to said second loop reactor comprises raising the number of continuously open settling legs and/or lowering the volumetric flow rate of the polyolefin slurry transferred from said first loop reactor to said second loop reactor comprises lowering the number of continuously open settling legs.

6. The process according to claim 4, characterized in that the outlet of at least one continuously open settling leg is provided with a control valve and in that raising the volumetric flow rate of the polyolefin slurry transferred from said first loop reactor to said second loop reactor comprises raising the opening of the outlet control valve of at least one continuously open settling leg and/or lowering the volumetric flow rate of the polyolefin slurry transferred from said first loop reactor to said second loop reactor comprises lowering the opening of the outlet control valve of at least one continuously open settling leg.

7. The process according to claim 1, characterized in that each inlet of said settling legs is connected to said first loop reactor by means of one transfer conduit provided with a bulk valve and in that a continuously open settling leg is a settling leg having its inlet bulk valve opened.

8. The process according to claim 1, characterized in that said first loop reactor is provided with two or more settling legs.

9. The process according to claim 1, characterized in that at least two settling legs are continuously open allowing continuous withdrawal and transfer of said slurry from said first loop reactor to said second loop reactor, and in that said process further comprises the step of controlling flow distribution among the continuously open settling legs.

10. The process of claim 1, wherein the step of controlling the flow distribution among the continuously open settling legs comprises:
monitoring flow from each settling leg, wherein said monitored flow is selected from flow of reactants to the subsequent reactor, flow of diluent to the subsequent reactor, flow of polymer solids to the subsequent reactor, the total flow transferred to the subsequent reactor, and combination thereof, and adjusting the monitored flow of at least one settling leg, the outlet of said settling leg being provided with a valve which is continuously open and in that said valve is used to adjust the flow of said settling leg.

11. The process according to claim 1, characterized in that no flow control and/or no pressure control are provided in said transfer line.

12. The process according to claim 1, wherein one or more flushing system is provided in each settling leg.

13. The process according to claim 1, wherein said polyolefin has a multimodal molecular weight distribution.

14. The process according to claim 1, wherein said polyolefin is polyethylene.

15. The process according to claim 1, wherein said polyolefin is prepared in the presence of at least one metallocene catalyst.

* * * * *